United States Patent [19]

Russ et al.

[11] Patent Number: 4,745,259

[45] Date of Patent: May 17, 1988

[54] AUTOMATIC CORNER WELDING ADAPTER

[76] Inventors: Wray H. Russ, 1419 Hickory St., Roseville, Calif. 95678; Ronald E. Roberts, 2533 Amaryl CT., San Jose, Calif. 95132

[21] Appl. No.: 887,227

[22] Filed: Jul. 21, 1986

[51] Int. Cl.⁴ ............................................... B23K 9/12
[52] U.S. Cl. ............................. 219/125.1; 219/124.1; 219/136
[58] Field of Search .................... 219/124.1, 125.1, 136

[56] References Cited

U.S. PATENT DOCUMENTS

| | | |
|---|---|---|
| 3,018,357 | 1/1962 | Kramer et al. ................... 219/124.1 |
| 3,068,351 | 12/1962 | Longenecker et al. .......... 219/125.1 |
| 3,119,009 | 1/1964 | Zeller ............................... 219/125.1 |
| 3,473,001 | 10/1969 | Oertel ............................... 219/125.1 |
| 3,505,496 | 4/1970 | Morley ............................. 219/124.1 |

*Primary Examiner*—Clifford C. Shaw
*Attorney, Agent, or Firm*—Robert Samuel Smith

[57] ABSTRACT

A device to which may be attached plates to be welded along a common corner line edge and a welding torch driven by a lead screw such that the plates are fuze welded together beginning and ending at arbitrary preset locations.

5 Claims, 6 Drawing Sheets

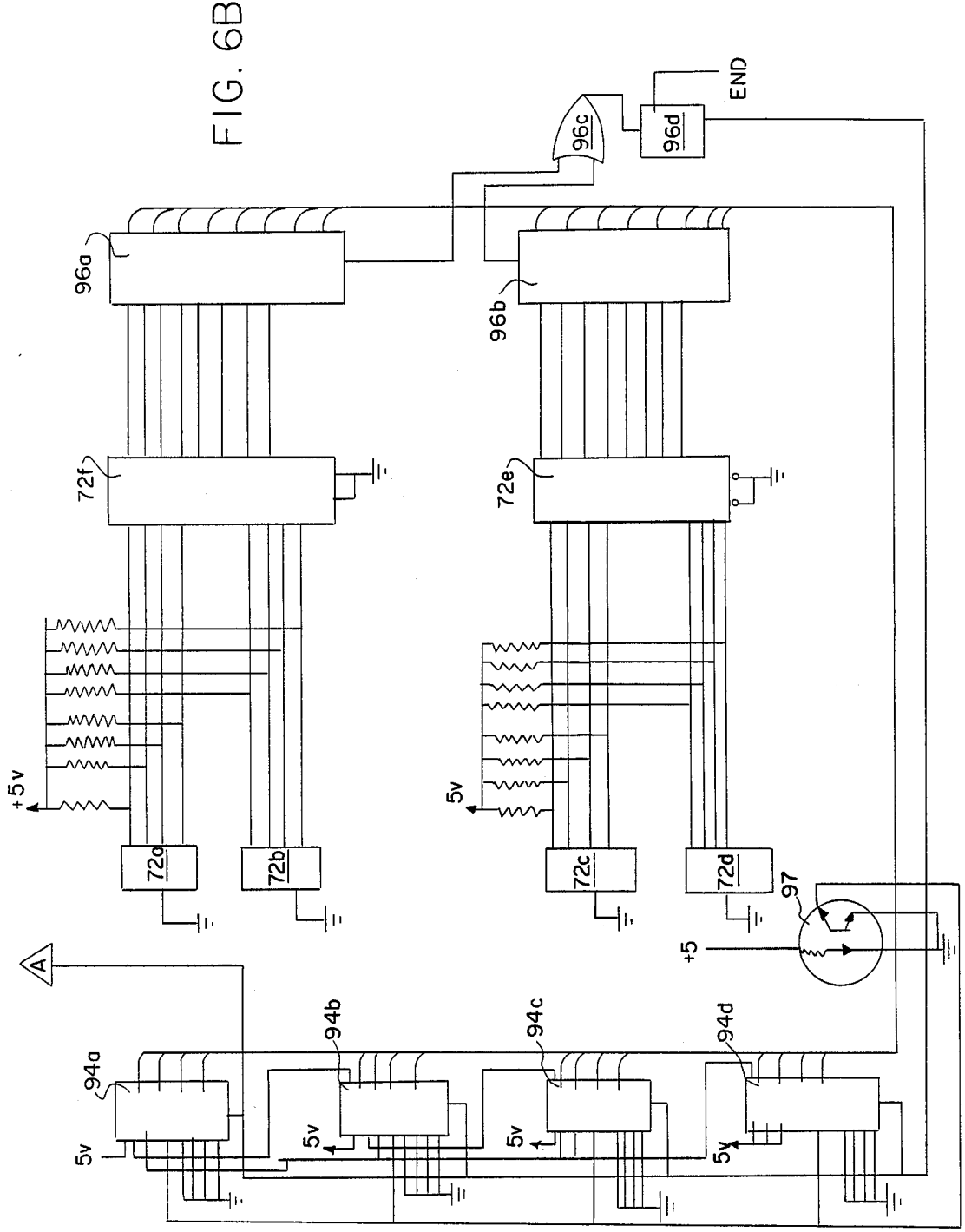

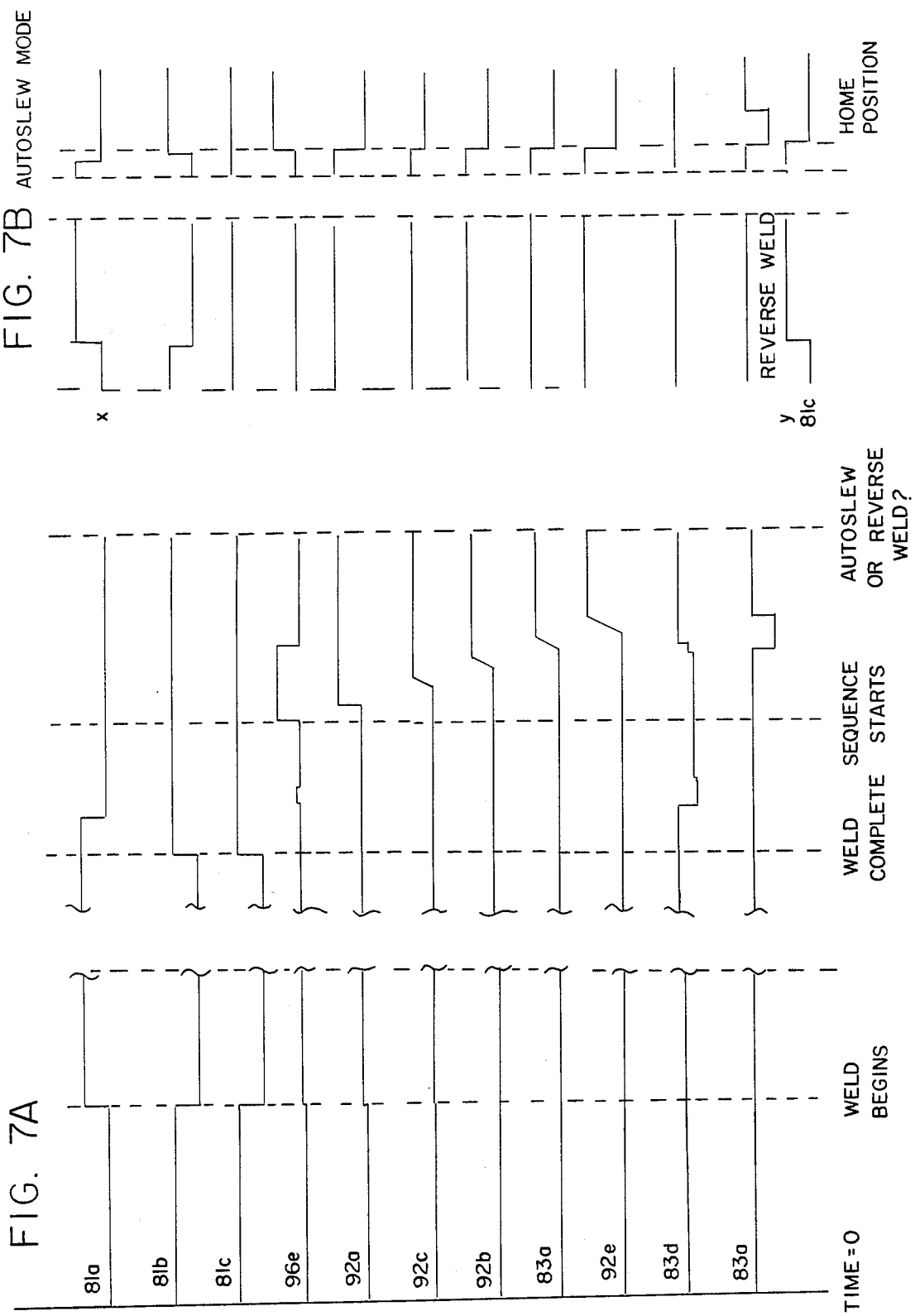

AUTOMATIC CORNER WELDING ADAPTER

BACKGROUND OF THE INVENTION

This invention relates to apparatus for automatically welding the edges of two perpendicular plates such as the corner of a box.

Prior Art

In the art of welding, a localized region of metal to be welded is heated by supporting the end of a tungsten electrode close to the region and imposing a voltage so that an arc is formed between the area being welded and the end of the tungsten electrode.

In a typical arrangement, the rod end is supported in a hand held "torch" whose other end is connected to a source of power. If the objective is to weld the edges of two perpendicular metal plates together such as to form a corner line, the molten region is moved along the line. In one type of welding, called bead welding, the end of a welding rod is dipped into the molten metal pool so as to deposit a "bead" which solidifies and strengthens the joint. In another type of welding, called fuse welding, no bead is added and the edges of the two plates simply melt and fuse together. Bead welding is used for relatively thick plates (greater than 0.090".) Fuse welding is used for joining thin plates.

There are a number of apparatus disclosed for automatic welding.

U.S. Pat. No. 3,795,786 discloses an apparatus for fuse welding copper components together in which the copper parts are clamped and "a surplus of heat energy greater than necessary to melt and coalesce the weld material is applied to the welding zone in order to burn away contaminants in the area to be welded".

U.S. Pat. No. 4,095,077 describes a method and apparatus for welding a number of tubes positioned end to end where the tubes are rotated while filler rod and heat is applied at the point of junction between the tube segments. Rate of applying the filler rod, heat, and speed of rotation are preprogrammed.

U.S. Pat. No. 4,010,346 describes a self propelled free wheeling tractor adapted to carry a welding tool along a work path predetermined by a template.

U.S. Pat. No. 4,206,309 describes an automatic welding apparatus having a controlled lineal torch motion in one direction at a controlled speed. The apparatus is specifically configured for welding the inside corners formed by a first plate having an edge abutting the surface of a second plate in that the apparatus provides for supporting two guns to apply filler material on both sides of the first plate so as to form a "Tee" joint. After completing the weld, the tool holder is released by a clutch arrangement so that the operator can return the tool holder to its original starting point for welding the next part. The position of the tool relative to the workpiece precludes the use of the apparatus to fuse weld the outside corner formed by the edges of two abutting plates.

Fuse welding is particularly useful where the metal plates are thin, e.g. less than 0.120 inches. In a typical sheetmetal job shop, there are frequent requests to fabricate small quantities of metal boxes of various sizes and wherein the thickness of the metal is less than 0.120 inches. These boxes are generally destined to be "show pieces" of electronic assemblies where appearance such as uniformity and the small size of the weld is highly valued. Cost in terms of speed of welding the box is also very important because of the highly competetive nature of the electronics business. For these reasons, an experienced high priced welding operator must be used to do the welding as it is now performed. He must be very skillful in manually maintaining a constant arc length and simultaneously regulating by means of a foot switch the arc current based on what his experienced eye can judge by peering through the eye filter glass attached to his helmet.

Fuse welding, rather than welding with the application of filler material, is the preferred technique for the fabrication of these joints because of the thinness of the plates and the desire to minimize for appearance sake the size of the weld ridge formed. In order to fuse weld the corner of the box, the welding torch must be positoned on the outside of the corner rather than on the inside of the corner. This is because the electric field that generates the arc will be most intense and concentrate at the very edge of the outside corner when the tool is outside the corner whereas if the tool is positioned on the inside of the corner, as shown in the arrangement of U.S. Pat. No. 4,206,309 the hot spot will occur on the inside of the box at a distance from the corner.

For the small job shop, it is desireable to have available means to adapt existing welding equipment to automatic welding technique without incurring a large investment in additional welding equipment. In view of the large range of box sizes and the small numbers of boxes per customer order, an automatic welding means for box corners should have the capability of making a weld starting and ending at any point along the edge.

SUMMARY

It is an object of this invention to provide an apparatus for fuse welding the edges of plates positioned to form a corner such as for making a box.

It is a further object of this invention to strike the arc on the outside of the corner in order to provide a more satisfactory fuze weld.

It is a further object to optimize the quality of the weld by providing means for continuous inspection and control of speed and heat of the electric arc.

It is another objective to provide an apparatus which is readily adaptable to welding a large range of lengths of weld and to be able to program the apparatus to start and stop the weld at desired locations.

It is yet another object of this invention to incorporate into the apparatus welding equipment which is normally found in the typical job shop such as a welding table and a welding torch and power supply with variable welding current so as to reduce additional capitol investment in the automated welding system.

Still another objective of the invention is to provide an apparatus for manufacturing high quality welded corners wherein the operation of the apparatus may be performed by semiskilled operators.

According to the invention, a base is provided which is clamped to the edge of a typical (steel) welding table. One work plate to be welded is clamped to the welding table and a second work plate is clamped to a base plate perpendicular to the table. Edges of the workplates meet so as to form the corner to be welded. The base plate is cut away and the first work plate overhangs the edge of the table so that a window is provided leaving exposed the outside corner of the joined workplates.

A welding torch is positioned and moved along the outside of the corner by a driving means. The driving means includes a torch holder threaded onto a long lead screw driven by a gear motor. The motor brakes magnetically thereby avoiding accumulated displacement errors due to starting and stopping. A frame holding an elongated eyecreeen enables an operator to view the welding action along the entire corner so that he may manipulate a knob for controlling the heat of the arc and a second knob for controlling the speed.

Controls are provided for starting and stopping the weld at desired locations so that a range of weld lengths is available. Attachment hardware for the base to the table is positioned under the table. By these means, various sizes of box can be accommodated.

The torch may be programmed to weld in one direction only after which the torch is returned automatically or manually to the original starting position. This capability is useful as a means of maintaining heat uniformity in certain situations such as welding along a corner from the box opening to the opposite end of the corner where the three sides of the box meet.

Alternatively, the torch may be programmed to weld in one direction after which a new part is mounted and the torch welds in the opposite direction back to its original starting point. This faculty provides for increased productivity.

A light signalling means indicates the direction of weld prior to the start of the drive.

BRIEF DESCRIPTION OF THE DRAWINGS

FIGS. 6A and 6B shows details of one embodiment of electronic circuitry for providing the objectives of the invention.

FIGS. 7a, and 7b show the voltage versus time of various locations of the circuit of FIGS. 6A and 6B.

DETAILED DESCRIPTION OF THE PREFERRED EMBODIMENT

Figure 1:
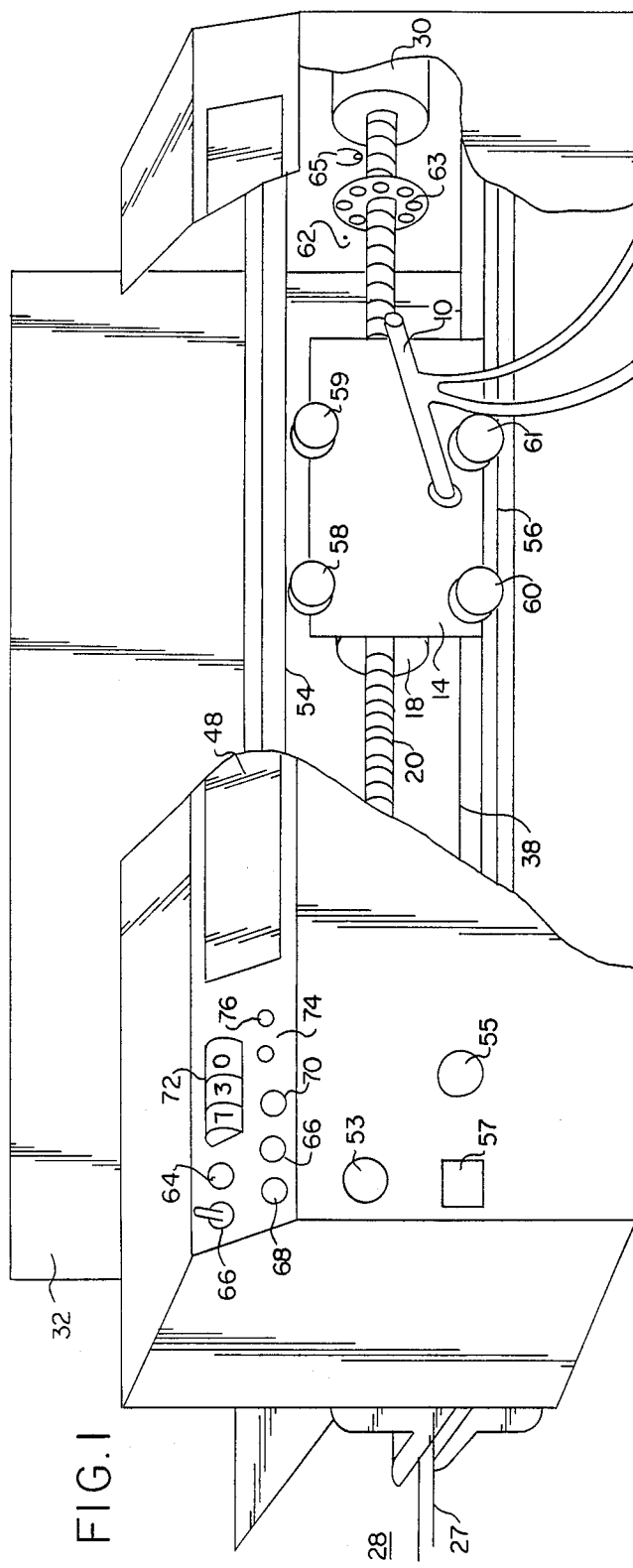
FIG. 1 is a perspective front view of the automatic welding adapter.
Figure 3:
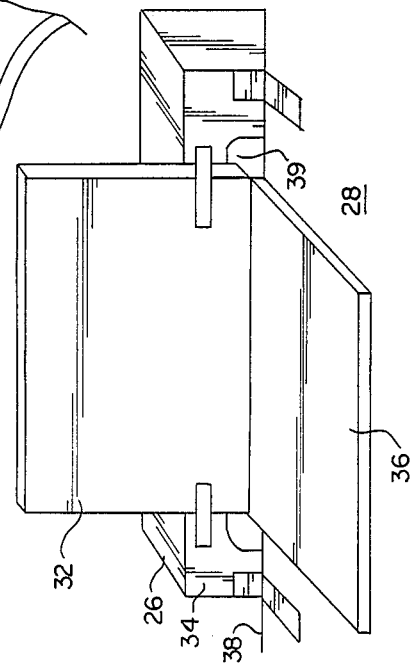
FIG. 3 is a perspective view of the welding adapter and plates to be welded attached to a bench.

Turning now to FIG. 1 there is shown a front assembly view of the automatic welding adapter prepared for welding. Construction details of the assembly shown in FIG. 1 may be further explained by reference to the sectional view in FIG. 2 and the rear view in FIG. 3. There is shown the welding torch 10 with the tip 12 of the welding torch 10 protruding through a hole in a torch support bracket 14 and fastened to the torch bracket 14 by the ceramic torch cone 16 screwed onto the end of the torch 10. The torch support bracket 14 is fastened to a lead bolt 18 which is threaded onto a lead screw 20. The lead screw 20 is rotatably supported at each end by bearings not shown mounted within housing 26.

Figure 2:
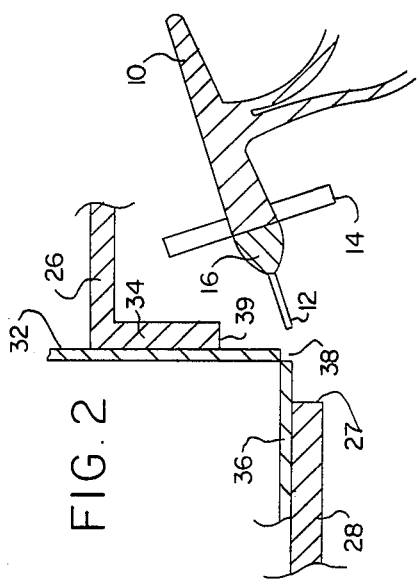
FIG. 2 shows details for positioning the welding torch relative to the corner line to be welded.

As shown in FIG. 2, the welding adapter housing 26 is attached to an edge 27 of a welding table 28.

A first work plate 32 to be welded is clamped to the work support panel 34 of the housing 26 perpendicular to the table 28 and the second work plate 36 is clamped to the table 28 and overhangs the table edge 27. The edges of the two work plates 32 and 36 meet to form the corner line 38 to be welded. The corner line 38 is exposed to and is in close proximity to the tip 12 of the torch 10 through an elongated aperture bounded by the edge 27 of the table 28 and an edge 39 of the work support surface 34. Electric power supplied to the torch 10 by the welder (not shown) generates an electric arc between the torch tip 12 and a spot on the corner line 38. The manner in which the work pieces are supported relative to the position of the electrode provides the greatest intensity of the field of the arc to be concentrated on the corner line so that the arc extends from the electrode directly to the corner line thereby ensuring that melting is concentrated on the corner line and not another area of the workplates.

When the lead screw 20 is rotated by gear motor 30, the torch tip 12 moves parallel to the corner line 38 thereby welding the work plates together along the corner line 38. Top and bottom guide rails 54 and 56, fastened to the housing, bear against bearings 58, 59, 60 and 61, attached to the torch support plate 14 thereby ensuring a constant distance between the torch tip 12 and the work corner 38 as the tip 12 is drawn along by the lead screw 20.

The lead screw is an acme thread, 10 threads per inch. A counting disk 63 having ten holes 57 equally spaced circumferentially around the disk 63 is positioned coaxially on the lead screw. A photo cell 62 and light 65 are positioned so as to detect (count) each hole 57 as the disk 63 rotates. Therefore, movement of the torch tip can be measured to within 0.010 inches.

An elongated window screen 48 is partially transparent and thereby permits viewing the weld by the operator in order that he may vary arc current and speed if he so desires. The current and speed controls, 53 and 55, are mounted on the housing. Power switch 57 is also shown.

Figure 4:
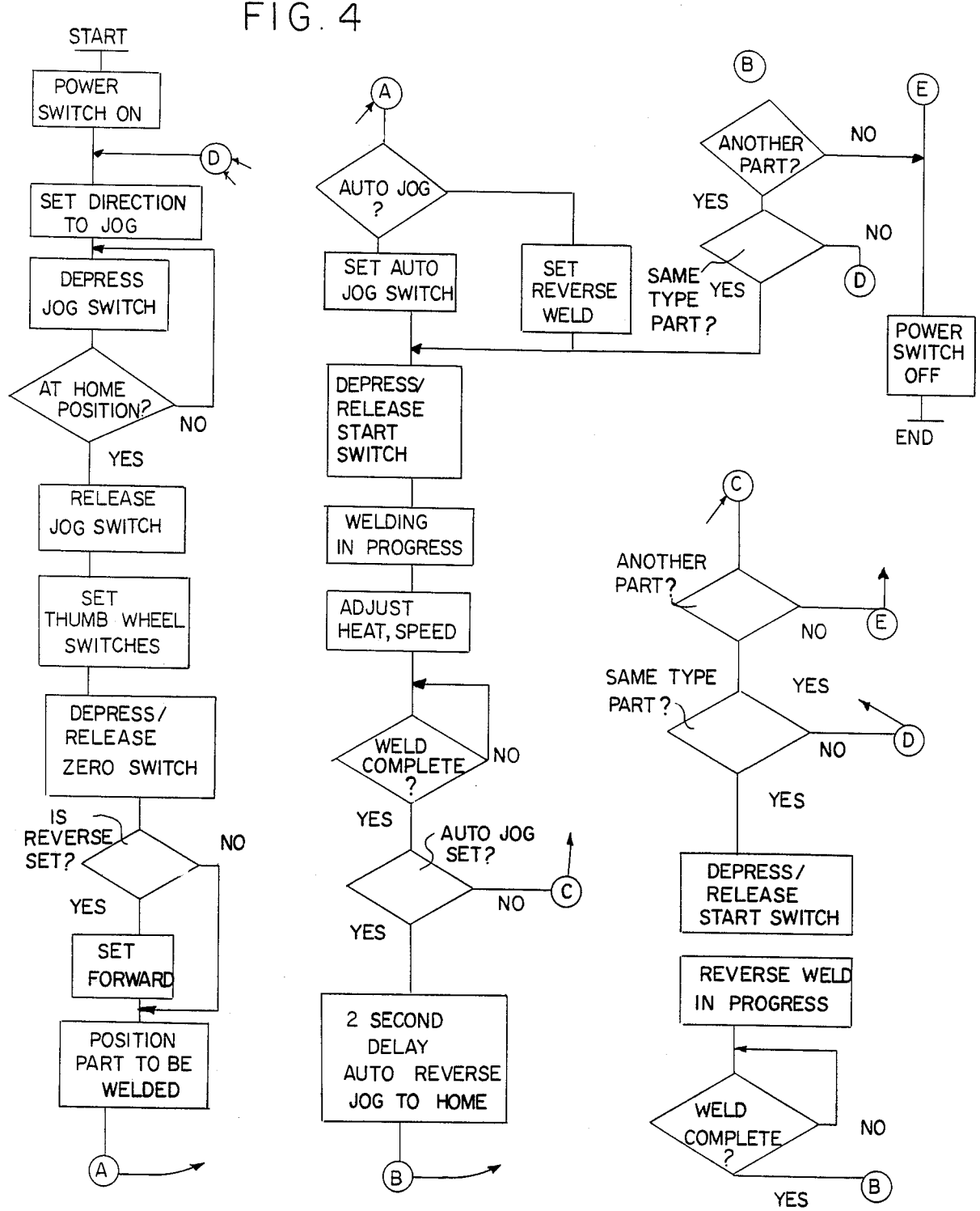
FIG. 4 is a process flow diagram illustrating the steps of operation.

The sequence of steps is illustrated by following the steps shown in the flow chart of FIG. 4 and referring to the controls shown in FIG. 1. As indicated, the first step is to depress the "power on" switch. Then the "direction" switch 66 is set preparatory to positioning the torch 10.

The "slew" switch 64 is depressed to move the torch to the beginning (or "zero" position) of the weld. The operator dials the desired length of the weld on a set of four "thumbwheel" switches 72.

A "zero" switch 68 is then depressed which causes the selected starting position of the torch to be a reference zero location for distance measurement by the machine.

Then the "direction" switch 66 is set for the desired direction of weld.

The operator sets a "mode" switch 70 in the "auto" position if he wishes the torch to return to the zero position after the weld is complete without welding in the reverse direction. He sets the same "mode" switch 70 in the "auto" position if he wishes to weld in the reverse direction as well as the forward direction.

To begin the weld cycle a "start" switch 74 is depressed which turns on the arc and causes the torch 10 to move from its "zero" position to the end of the weld. As the operator conveniently views the welding operation through the window screen 48, he may make adjustments of the arc current by current control knob 53 and the speed of the torch by speed control knob 55. There is also a red (panic) "stop" switch 76 which shuts off the motor driving the torch and the arc in the event of an emergency.

After the torch 10 travels the distance preset by the "thumbwheel" switches 72, the torch motion stops and the arc shuts off.

If the machine is in the "auto-slew" mode, there is a two second delay in order to allow the direction circuitry to stabilize and then the torch returns to the "zero" position automatically. The welded work plates are removed and new plates mounted into position for the next welding operation. Then the operator depresses the "start" switch 74 and the welding cycle is repeated.

If the mode switch 70 is in "reverse weld", the torch stops and arc shuts off when the weld is completed. The operator removes the welded part and inserts the next plates to be welded. The operator then depresses the start button so that the torch welds while returning to the "zero" position.

Figure 5:
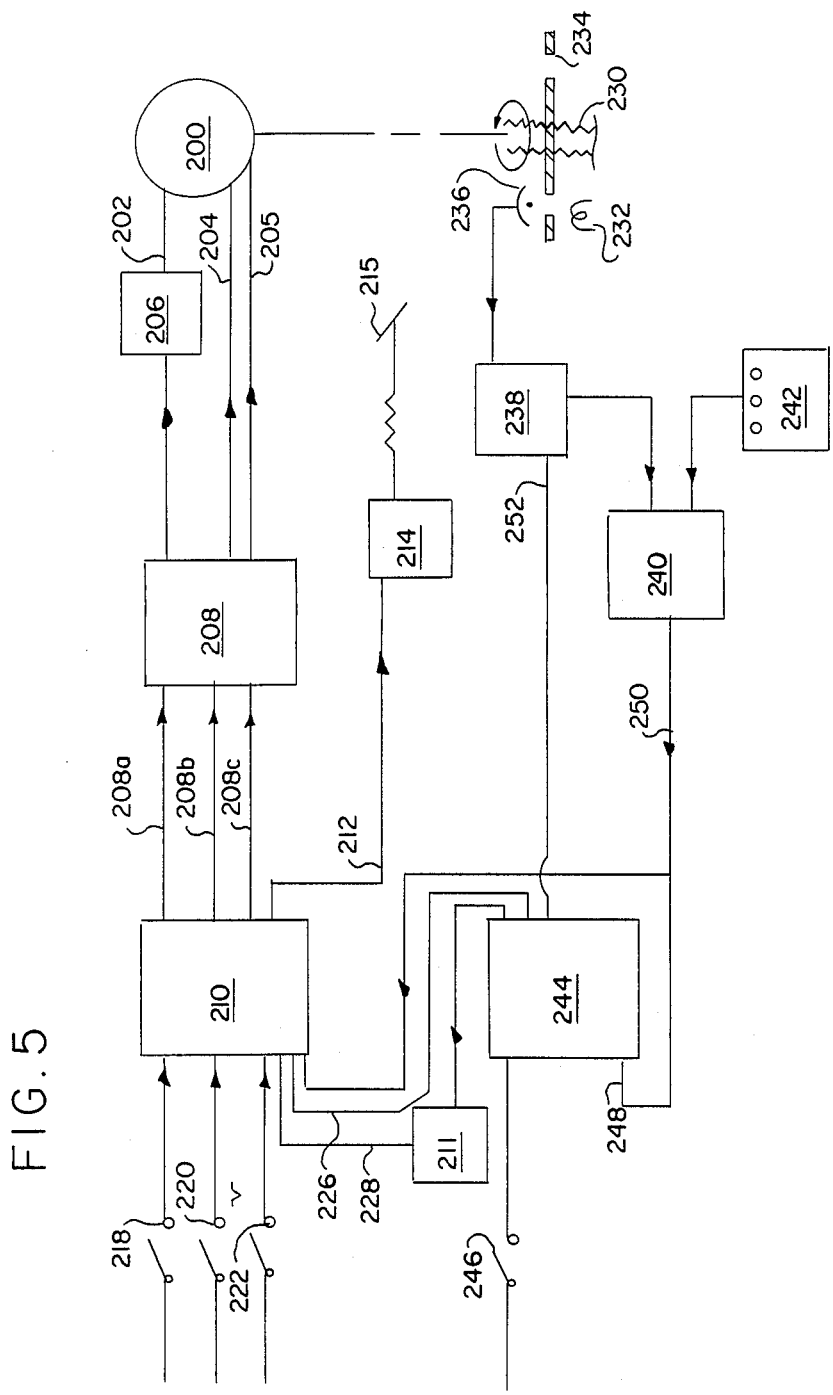
FIG. 5 is a block logic diagram of the circuitry.

In FIG. 5 is shown a diagram that illustrates the circuit logic incorporated into the adapter in order to perform the functions of the invention. There is shown a motor 200 having three leads. Lead 202 is connected to speed controller 206. The electrical polarity of leads 204 and 205 are interchanged when it is desired to reverse the direction of motor rotation. Speed controller 206 and leads 204 and 205 are connected to the motor switching section 208 which supplies power to the motor and determines direction according to the signals on input terminals 208 a, b, c which are connected to a motor logic section 210. A connector 212 from the an output terminal of motor logic section 210 also turns the switch 214 off or on for the arc 215.

Consequently, the signals to the input terminals of motor logic block 210 control the sequence of operations involving the motor and arc. These input signals are derived from manually operated switches which include a reversing switch 218, a slew switch 220 (for moving the torch to an arbitrary starting position), a start switch 222 to start the motor and turn on the arc. Three other inputs, 250, 226 and 228 which are activated after the weld has been completed and are discussed below in connection with automatic operation.

Referring still to FIG. 5, as the lead screw 230 turns, light pulses from emitter 232 through aperture wheel 234 detected by detector 236 are counted by pulse counter section 238. Compare section 240 emits an "end of weld" signal on the output 250 when the number of pulses equals the corresponding number dialed into the distance register 242 by the operator.

The "end" signal is sent via connector 250 to the motor logic section 210 which turns off the motor and arc.

The "end" signal is also sent to an input terminal 248 of the "mode logic" section 244 causing the mode logic section to emit a signal via connector 252 to the pulse counter which resets the pulse counter 238 to zero. The mode section 244 also sends a signal via connector 226 to the motor logic section 210 which reverses the direction of turning of the motor when the motor is started again.

Next the mode section responds according to the setting of the mode switch 246 selected by the operator.

If the mode switch is in the "automatic return" position, a signal is sent to motor logic section via connector 228 to start the motor again so as to return the torch to its original starting position where it stops due to the generation of a second end signal. Counter block 211 provides that the torch remains at the initial starting position after completion of the weld and return to zero.

If the mode selection switch is in the "reverse weld" position, then the operator substitutes new work plates to be welded and presses the start switch thereby welding back to the original position.

Figure 6A:
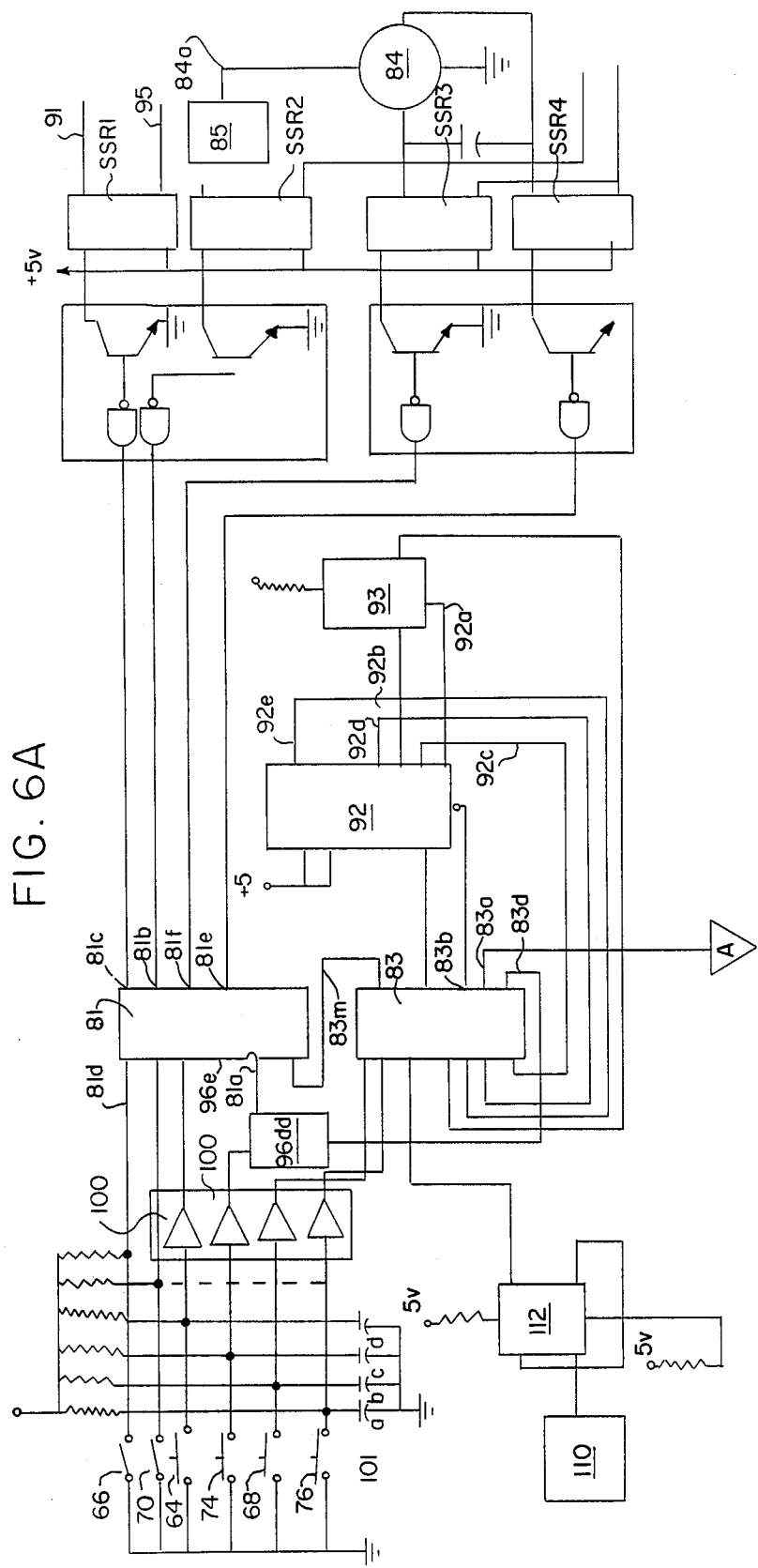

Circuit details for one embodiment of the block diagram presented in FIG. 5 are presented in FIGS. 6A and 6B.

The operation of the circuit in FIGS. 6A and 6B may be explained by studying FIGS. 6A and 6B in conjunction with the timing diagrams of FIGS. 7A and 7B which indicate the voltage versus time of various circuit locations identified by corresponding letters.

In FIG. 7A, time t=0 is defined as the condition when the operator has set the "direction" switch 66 in forward or reverse, established reference "zero" location by depressing the "zero" switch 68, and set the "mode" switch in "auto-slew" or "reverse-weld" position. He is thus prepared to depress "start" and initiate the welding operation.

In FIG. 7A, time t=A is the instant when the machine has completed the weld and will proceed with the in the "auto-slew" mode as continued in FIG. 7B or with the "reverse-weld" mode as continued in FIG. 7b.

Referring now to FIGS. 6A and 7A, pulses generated by closing the "direction" 66 "mode" 70 and "zero" 68 switches and the "stop" switch 76 momentarily are shaped by the charging capacitors 101 a,b,c,d and the 7407 buffer chip 100 for presentation to the programmable logic chips 81 and 83.

When "direction" switch 66 is open (forward direction), line 81$d$ hence line 81$e$ (from pin locations 1 and 16 of the chip 81, the motor control section) will be high. This will ground motor lead 84$a$ through the SSR2 (solid state relay) and 75451 chip 88 of the motor driver section.

When "direction" switch 66 is closed (reverse), 81$d$ is low hence line 81$f$ from pin 17 will be high enabling 75451 chip 88 of motor control section so that motor lead 84$a$ will now be connected to the 115 volt power input line through SSR 3. The motor 84 will now turn in the reverse direction when power is applied by depressing the start button 74.

When "zero" switch 68 is depressed momentarily, line 83$a$, pin 14, of chip 83 goes low so as to reset to zero the LS160 counter chips 94 a,b,c and d. Line 83$b$, pin 15, also goes low to disable LS160 sequencer chip 92 which, in turn, enables line 92$a$ to reset LS123 delay chip 93. Delay chip 93 is a two second delay which causes the timer to delay initiation of the arc for two seconds while the solid state relays controlling motor direction are switched.

Thumbwheel switches 72 a,b,c,d of weld length section 98 are set equal to the desired length of weld. The setting of these switches is registered on the output pins of the LS240 counter chips 72$e$ and $f$, and thence to the LS682 comparator chips 96$a$ and 96$b$ of comparator section 96.

At time t=0, when the "Start" switch 74 is momentarily depressed, a pulse to the 7407 buffer chip 100 enables 81$a$ (pin 5 of 16L8 programmable chip 81). This enables 81$b$ so as to enable motor control circuit 89 (consisting of 16L8 programmable logic chip 81, and solid state relay SSR1) to turn on the motor 84 whose speed has been preset by speed control 85. Location 81$c$ (pin 19 of PAL (programmable array logic) chip 81 goes low so as to close SSR 1 of the Arc control section 88 thereby connecting the Arc in 91 and out 95 lines so that the arc comes on.

As the motor 84 turns, the aperture wheel turns thereby sending pulses from the "optic eye" section 97, to the counter section consisting of four LS160 counter chips 94 a,b,c and d. Chips 94 a,b,c and d counter the pulses and send the "count" to the LS682 compare chips 96a and b and are compared to the count from LS240 counters 72e and f set by the thumbwheel switches according to the desired length of weld. Output from the two comparator chips 96a and b is "ored" by logic chip 96c which sets LS279 "end" latch (flip-flop) 96d. The "end" signal is activated on line 96e and is transmitted back to pin 4 of the 16L8 PAL chip 81. Pins 81b and c are thereby activated so as to stop the motor and arc by de-energizing the solid state relays SSR1 and SSR2.

In order to initiate a series of events after completion of the first weld and shutting off the motor and arc, an LS160 "sequencer" chip 92 is activated. In order to activate the sequencer 92, pulses generated continuously by a 3.6 megacycle clock 110 activate flip flop 112 whose pulses (generated at one half the rate of the clock 110) are received at pin 1 of PAL timer 83. (This clock runs all of the time that the power is on>. Therefore, when "end" signal 96e is received by PAL timer 83 at pin 8, 83b becomes active and therefore sequencer 92 sequences i.e., for every pulse in at pin 8, pins 3 to 6 and 10 to 13 become activated consecutively.

The first signal from the sequencer is at pin #3 which enables LS123 timer 93 through line 92A so that when pin 5 (line 92B) is activated in sequence after pin 4, the LS123 "two second delay" timer 93 starts. The two second delay timer counts two seconds in order to allow the "direction" circuitry to stabilize before re-starting the motor.

Pin 4 (line 92C) is activated (before pin 5) and activates 83D which in turn resets the LS279 start latch 96DD (in preparation for the next "start" signal.) Note that the "start" latch 96DD and the "end" latch 96D are part of the same LS279 chip.

Next, line 92D from pin 6 of sequencer 92 is activated and goes to pin 6 of 16R6 PAL thereby generating an out put on line 83A which clears the LS160 counter chips 94a and b,c and d so as to remove the "compare" signal at the LS32 OR gate 96c. It also clears the LS279 SR ("set-reset") latch 96d in preparation for the next "end" signal.

Next, pin 13 (92E) comes up and goes to pin 5 of 16R6 PAL timer 83.

This generates a "delay" signal from pin 4 of the LS123 timer 93 which goes to pin 4 of 16R6 timer 83 thereby generating an autostart signal at pin 18 on line 83m which goes to pin 6 of 16L8 chip 81.

(At this instant, mode is sensed corresponding to point A on the volt-time diagram of FIG. 7b.)

If the mode is auto-slew, refer to FIG. 7b where line 81c is shown having a volt-time dependence differing from the reverse weld mode and is labelled x. The motor will be turned on by activating pin 81b so that the torch returns to "zero" location.

Because the sequencer 92 has activated pin 5 of PAL timer 83, then, when the torch traverses the weld distance and the "end" signal is generated again, line 83A is activated which resets the counters, 94 a,b,c and d; and clears S/R "end" latch 96D
line 83b is activated which resets sequencer chip 92;
line 83d is activated which resets 96DD.

If the mode is "reverse weld", (refer to lines labelled y for the voltage time on line 81a), the machine waits for manual start signal generated by depressing the start switch 74.

When the "end" signal is generated again and because the sequencer has activated pin 5 of 83, then lines 83 A,B and C are activated so as to reset the counters 94, sequencer 92 and end-start latch 96D and 96DD as discussed previously.

The foregoing description and drawings of the mechanical construction and electrical circuits present one preferred embodiment for carrying out the teachings of this invention. After studying the descriptions and drawings, it will be obvious to one skilled in the art that variations can be introduced that also accomplish the objectives of this invention. Such variations are also claimed as falling within the scope of the invention.

I claim:

1. An adapter for supporting a torch to fuse weld a corner line formed by a first edge of a first plate in contact with a second edge of a second plate wherein said first plate is inclined to said second plate so as to form an angle having an inside and an outside and wherein said adapter comprises:

a plate support means for supporting said second plate in proximity to said first plate so that said first and second edges meet to form said angle with said corner line;

a moveable torch support means for supporting said torch so that an electrode on one end of said torch is in proximity to said corner line on said outside of said angle and which further comprises a threaded nut;

a lead screw having two ends which are rotatably attached to said plate support means aligned parallel to said corner line and threaded into said nut;

a reversible motor coupled to said lead screw so that when power is applied to said motor, said lead screw rotates thereby causing said moveable torch support means to move so that said electrode moves parallel to said corner line;

arc switch means for initiating and interrupting said arc;

a motor logic circuit means connected to said motor and said arc switch means;

means for turning said motor off and on connected to said motor logic circuit means;

a manually operated reversing switch means connected to said motor logic circuit means so that when said manually operated reversing switch is activated and said motor is turning, said motor will turn in a direction opposite to that when said manually operated reversing switch is deactivated;

a manually operated slew switch means connected to said motor logic circuit means;

a manually operated start switch means connected to said motor logic circuit means;

so that an operator may operate said reversing switch and said slew switch means and said manually operated start switch means to move said torch to an arbitrary position preparatory to starting the welding operation and when said operator depresses said start switch means, said motor turns thereby moving said torch and said arc turns on.

2. An adapter as in claim 1 which further comprises:

a reversing circuit means with an input terminal for controlling the direction of turning of said motor when said arc is on which is connected to said motor logic circuit means;

an aperture plate mounted concentrically onto said lead screw having a plurality of holes distributed on a circle;

a source of light on one side of said aperture plate and emitting light incident onto said plate;

a photodetector having an output terminal and positioned on a second side of said plate so that said photodetector emits a pulse as said lead screw rotates and said beam passes successively through each said hole and therefore the number of pulses is proportional to the distance travelled by said torch;

a pulse counter means having a first input terminal and a second input terminal attached to said output terminal of said photoconductor and an end terminal connected to said input terminal of said reversing circuit means and a memory means to store the number of pulses so that when a number of pulses is stored corresponding to a desired length of weld, an end signal is emitted at said end terminal so as to reverse direction of further turning of said motor;

a manually operated zero switch means having an output terminal attached to said first input terminal of said pulse counter means which is activated before welding in order to set said number stored in said memory to zero.

3. An adapter as in claim 2 wherein said pulse counter further comprises:

a manually operated registration means having a plurality of output terminals so that an arbitrary number corresponding to the desired length of weld can be represented as voltages on said registration output terminals;

a comparator means having an input terminal connected to each registration terminal and to said input terminal of said pulse counter and an output terminal connected to said end terminal;

so that when the number of said photodetector pulses equals said arbitrary number, said end signal is generated on said end terminal and thereby reverses direction of further turning of said motor.

4. An adapter as in claim 3 which further comprises a connection from said end terminal to said motor logic circuit means so that when said end signal is generated, said motor logic circuit means causes said motor to shut off and said arc to shut off.

5. An adapter as in claim 4 wherein said motor logic circuit means further comprises a start input terminal which starts said motor when activated and wherein said adapter further comprises:

a manually operated "mode" switch means having a "reverse weld" position and an "automatic return" position and a "mode switch" terminal;

a logic "mode" circuit means having a first input terminal connected to said "end" terminal, a second input terminal connected to said "mode switch" terminal, a third input terminal and a first, second, third, fourth, fifth and sixth mode output terminal;

a connector from said first mode output terminal to said "reverse" input terminal;

a connector from said second mode output terminal to said first input terminal of said pulse counter so that when said end signal is generated said counter is set to zero and said motor leads are connected for turning said motor in reverse;

a connector from said third mode output terminal to said start input terminal so that when said third mode output motor is activated, said motor will start;

a logic "count" means having an input terminal connected to said "end" terminal and an output terminal connected to said third input terminal of said "mode" circuit means so that with every other signal from said "end" terminal, said fifth output terminal of said "mode" circuit means is enabled;

so that when an "end" signal is generated after completion of a weld and said mode switch means is in said "automatic return" position, said mode circuit output terminals, first through third, are successively activated thereby returning said torch to said original position in preparation for a next welding operation;

and so that when an "end" signal is generated and said mode swirch is in said "reverse weld" position, said motor and arc are shut off, said first and second mode circuit output terminals, are activated thereby causing said counter to reset to zero and a motor reversing signal to be generated in preparation for welding in the reverse direction back to the original position.

* * * * *